(12) United States Patent
Pupius et al.

(10) Patent No.: US 8,245,125 B1
(45) Date of Patent: Aug. 14, 2012

(54) HYBRID RENDERING FOR WEBPAGES

(75) Inventors: Daniel Felix Pupius, San Francisco, CA (US); Mark David Knichel, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/308,203

(22) Filed: Nov. 30, 2011

(51) Int. Cl.
*G06F 17/00* (2006.01)
(52) U.S. Cl. ........................................ 715/208; 715/234
(58) Field of Classification Search .................. 715/208, 715/234, 271
See application file for complete search history.

(56) References Cited

U.S. PATENT DOCUMENTS

| 7,133,896 B2 * | 11/2006 | Ogdon et al. ................. 709/205 |
| 8,078,759 B2 * | 12/2011 | Seifert et al. ................. 709/246 |
| 2011/0302235 A1 * | 12/2011 | Monk et al. ................... 709/203 |

* cited by examiner

*Primary Examiner* — Adam M Queler
(74) *Attorney, Agent, or Firm* — Sterne, Kessler, Goldstein & Fox P.L.L.C.

(57) ABSTRACT

Disclosed herein are methods and systems for hybrid rendering of web applications. A request for a first webpage is sent to a server-side renderer from a web browser. The first webpage and associated JavaScript instructions are received in the web browser from the server-side renderer. The first webpage is displayed in the web browser. It is then determined if the JavaScript instructions are loaded in the web browser. If the JavaScript instructions are loaded, a second webpage is rendered in the web browser based upon a request for the second webpage. If the JavaScript instructions are not loaded, the web browser sends the request for the second web page to the server-side renderer.

20 Claims, 4 Drawing Sheets

HYBRID RENDERING FOR WEBPAGES

BACKGROUND

This specification relates to web applications.

In recent years, many web applications have shifted from being rendered on a server to being rendered in a web browser. Client-side rendering or rendering in a web browser often provides a more seamless browsing experience because the pages are not seen as refreshing. Client-side rendering also permits for parts of a webpage to be rendered instead of the entire page. As a result, in some circumstances, client-side rendering is more efficient since not all of the resources required by the fall webpage need to be rendered. In order to client-side render a web application, a web browser receives instructions, typically JavaScript, from the server defining how the web application is to be rendered. However, until the web browser receives and loads these instructions, the web pages can't be client-side rendered. As a result, client-side rendering may have an initial lag time in order to start rendering web pages compared to rendering web pages on a server.

SUMMARY

In general, one aspect of the subject matter described in this specification can be implemented in methods that include the actions of sending, from a web browser, a request for a first webpage to a server-side renderer, receiving the first webpage and JavaScript instructions associated with the first web page from the server-side renderer, displaying the first webpage in the web browser, determining whether the JavaScript instructions are loaded in the web browser, if the JavaScript instructions are loaded, rendering, in the web browser, a second webpage based upon a request for the second webpage, and if the JavaScript instructions are not loaded, sending, from the web browser, the request for the second web page to the server-side renderer.

Other implementations include corresponding systems, apparatus, and computer programs, configured to perform the actions of the methods, encoded on computer storage devices.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
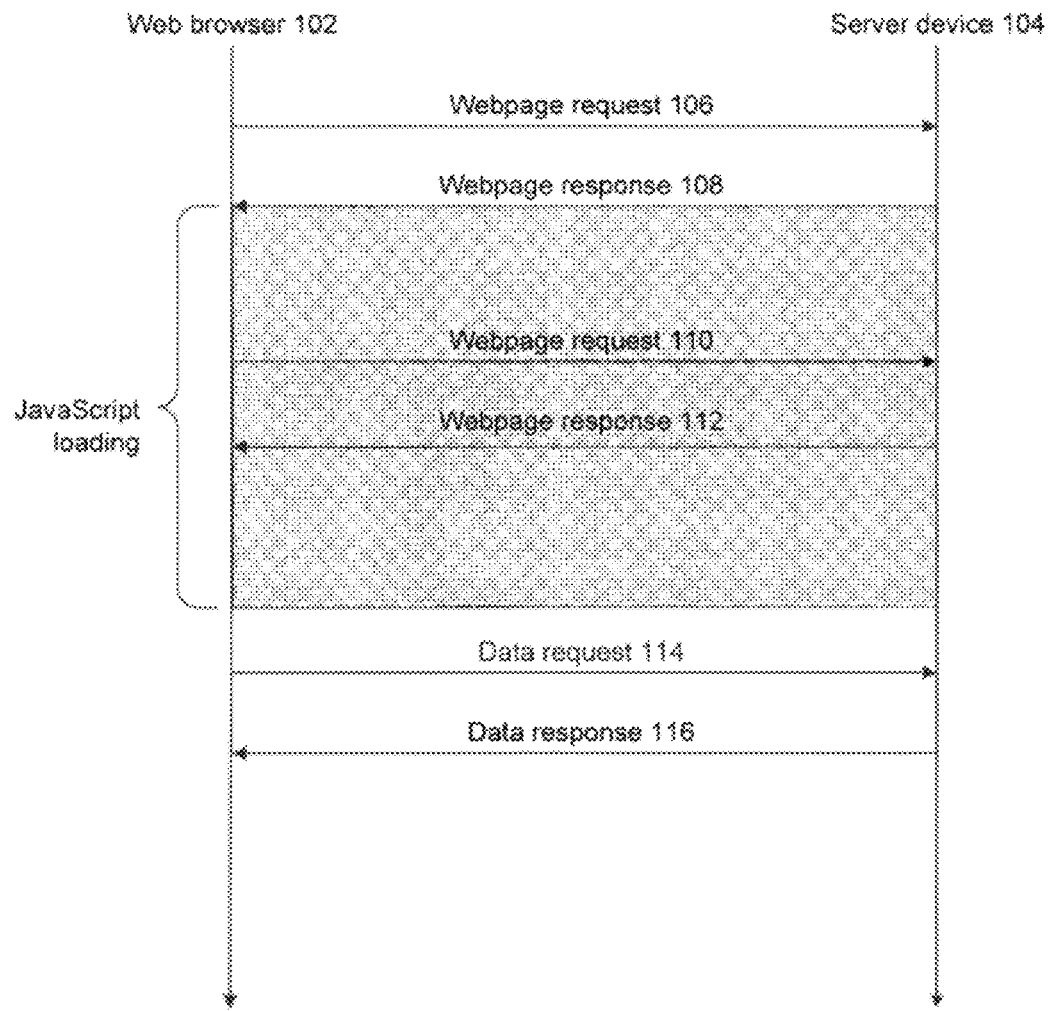
FIG. 1 is a timing diagram of hybrid rendering of webpages over a period of time, according to an embodiment.

FIG. 1 is a timing diagram of hybrid rendering of webpages over a period of time, according to an embodiment. FIG. 1 depicts a web browser 102 and a server device 104. Web browser 102 may be connected to server device 104 through a network, such as a wide area network (WAN) or a local area network (LAN). For example, web browser 102 may be connected to server device 104 over the Internet or through an intranet. Web browser 102 may communicate with server device 104 through the use of a communication protocol. For example, web browser 102 may communicate with server device 104 using hypertext transfer protocol (HTTP). A user using web browser 102 may first request a webpage in the form of webpage request 106. As used herein, the term webpage may mean, a part of a web application, a webpage, a view, a navigation, media, or any other type of content that is displayed to the user in a web browser. A webpage request may be a request for a webpage, a view, a navigation, media, or other type of content that is displayed to the user in a web browser.

Web browser 102 may be configured by default to request all webpages be rendered server-side. In particular, webpage request 106 may include a URL identifying a webpage and parameters that server device 104 may use to render webpage response 108. After server device 104 has rendered the webpage, the rendered webpage may be sent back in the form of webpage response 108. Webpage response 108 may include webpage content, such as HTML, CSS, and JavaScript instructions. The JavaScript instructions, in part or whole, may direct web browser 102 to render some or all subsequent webpage requests client-side, instead of server-side. However, in some cases, the JavaScript instructions may instead be instructions to download further JavaScript instructions. In particular, the instructions may instruct web browser 102 to download further JavaScript instructions asynchronously. In such a case, the further JavaScript instructions, in part or whole, may direct web browser 102 to render some or all of the subsequent webpage requests client-side. However, depending on the length and number of JavaScript instructions, a period of time may elapse until the JavaScript instructions are fully loaded by web browser 102.

During the period when the JavaScript instructions are being loaded, requests for webpages may be rendered server-side by server device 104. In particular, web browser 102 may be configured to transmit requests for webpages located on server device 104 to server device 104 for server-side rendering until the client-side rendering JavaScript is loaded. This may result in having to reload the JavaScript instructions over again, since new JavaScript instructions may be included with web page response 108. Web page response 108 may include URLs that correspond to webpages that may be rendered server-side. For example, the HTML in web page response 108, may contain anchor tags with URLs to webpages or parts of a web application on server device 104. Accordingly, if a user clicks on content that triggers a webpage request, such as a link, the associated URL may be transmitted to server device 104 and the corresponding webpage may be rendered server-side. Thus, webpage request 110 is sent from web browser 102 and server device 104 renders the corresponding webpage and sends webpage response 112 to web browser 102. However, once the JavaScript instructions have loaded, then subsequent requests may be rendered client-side.

The JavaScript instructions may instruct the web browser how to render subsequent web page requests client-side. In particular, the instructions may specify how and what type of data or content may need to be retrieved in order to complete the rendering of subsequent webpage requests. The instructions may further include presentation instructions specifying how the content is presented in web browser 102. For example, the instructions may create HTML, CSS, or both that is displayed in web browser 102. Data request 114 is a request for data from server device 104. After the JavaScript has loaded, data requests may be made, instead of requests for full webpages to be rendered. Data request 114 may be in extensible markup language (XML) and sent asynchronously from web browser 102 using asynchronous JavaScript and XML (AJAX). Data request 114 may have parameters which further define the data request. In response to data request 114, server device 104 may respond with data response 115, which may contain the data requested by data request 114. Server device 104 may obtain the data contained in data response 116 through a number of sources. For example, service device 104 may obtain the data based upon the parameters included in data request 114, some logic, and external data sources, such as a database. Once the data is received by web browser 102, the data in conjunction with presentation instructions may be used to render client-side the requested webpage in web browser 102.

Figure 2:
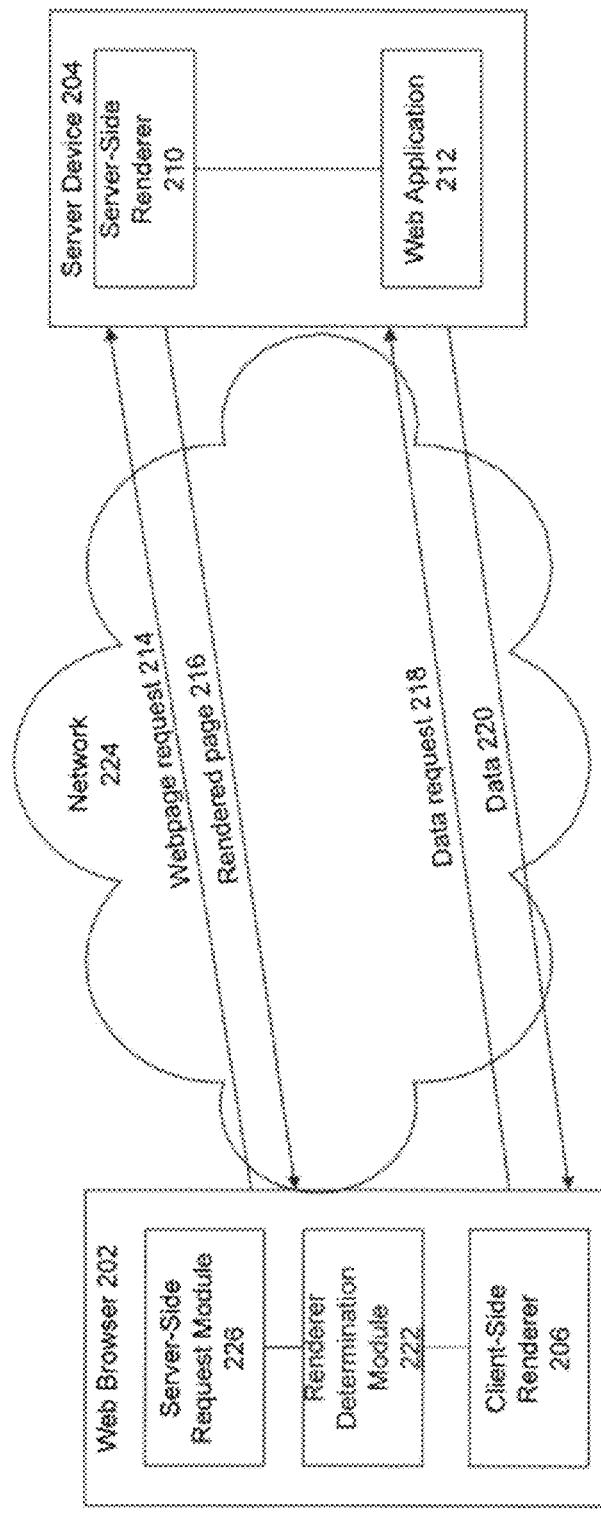
FIG. 2 is a block diagram of a system for hybrid rendering of webpages, according to an embodiment.

FIG. 2 is a block diagram of a system for hybrid rendering of webpages, according to an embodiment. System 200 includes a web browser 202 and a server device 204. Web browser 202 may communicate with server device 204 over a network 224 using web communication protocols. For example, web browser 202 may communicate with server device 204 using HTTP. Server device 204 may be any type of computing device and any number of computing devices that alone or in combination implement system 200. For example, server device 204 may be a single web server, or a number of computing devices coupled together to form a cloud architecture for the hosting of web applications. Web browser 202 may be a standalone software application or a part of a software application that displays or uses a web application, website, or webpage. Web browser 202 may support a variety of content types, such as HTML, HTML5, CSS, and JavaScript. Furthermore, web browser 202 may run on any type of computing device, such as a personal computer or mobile phone.

Server device 204 includes a server-side renderer 210. Server-side renderer 210 may be configured to receive a webpage request 214 from server-side request module 226, render rendered page 216, and then send rendered page 216 to web browser 202. Webpage request 214 may comprise a URL and parameters. Server-side renderer 210 may render rendered page 216 based on parameters received in webpage request 214, a variety of data sources, such as databases, and logic which runs within server-side renderer 210. The logic may be contained in a web application 212. While Rendered page 216 may contain HTML, rendered page 216 may also contain other content, such as JavaScript and CSS, which may affect the ultimate presentation of rendered page 216 in web browser 202. Thus, while rendered page 216 may be sent to web browser 202, there may still be more rendering that web browser 202 may perform until the final webpage is displayed. For example, rendered page 216 may include cascading style sheets (CSS). CSS is a scripting language that may describe presentation properties a webpage may have while the webpage is displayed in a web browser. Thus, if CSS is sent in or alongside rendered page 216, the web browser may still need to apply the CSS to create the final webpage displayed to the user. Similarly, JavaScript instructions may be sent alongside or within rendered page 216. JavaScript instructions may also be configured to affect how the ultimate page is displayed in the web browser. For example, the JavaScript instructions, when executed, may generate further HTML which is displayed in the web browser. The JavaScript instructions may also be configured to render subsequent page requests client-side.

Web browser 202 includes a client-side renderer 206. Client-side renderer 206 may be configured by JavaScript instructions received from server device 204. Using these instructions, client-side renderer 206 may render webpages in web browser 202 instead of requesting webpages to be rendered by server device 204. The JavaScript instructions may be sent within or alongside rendered page 216. Depending, on the length and number of instructions, the JavaScript instructions may take a period of time to be received by web browser 202 from client-side renderer 206. The instructions may specify how particular webpages that may be requested from within rendered page 216 may be rendered by client-side renderer 206. Thus, the instructions, although not HTML themselves, when executed, may result in content, such as HTML being displayed in web browser 202. If external data is needed to render the particular webpages, the instructions may specify how the external data may be requested. For example, the external data may be requested using AJAX. In particular, client-side renderer 206 may send a data request 218 to server device 204 and in return receive data 220. Data request 218 and data 220 may be formed using extensible markup language (XML). Data 220 may then be used in the client-side rendering of a requested webpage.

Web browser 202 also includes a renderer determination module 222. Renderer determination module 222 may be configured to determine whether a page should be rendered using client-side renderer 206 or server-side renderer 210. Renderer determination module 222 may be further configured to make that determination based upon whether the JavaScript instructions, received alongside or within rendered page 216, have been fully received and loaded in web browser 202. If the JavaScript instructions have been received and loaded, then renderer determination module 222 may use client-side renderer 206 to render a webpage. If the JavaScript instructions have not been received or loaded, then renderer determination module 222 may use server-side request module 226 to send the web page request to server-side renderer 210. Whether the JavaScript instructions have been received or loaded may depend on the context. In particular, in an embodiment, the JavaScript instructions initially sent with rendered page 216 may be minimal and include instructions to download further JavaScript instructions. For example, the initial instructions received by web browser 202 may instruct web browser 202 to download further instructions asynchronously. Those further instructions may then contain the necessary logic to client-side render web application 212. In such a case, renderer determination module 222 may wait until part or all of the instructions are downloaded before client-side renderer 206 may be used.

In one embodiment, the JavaScript instructions may be configured such that once they are loaded by web browser 202, all requests for web pages are automatically handled through client-side render 206. In particular, the JavaScript instructions may be configured to capture all or certain clicks in the web browser once loaded. For example, the JavaScript instructions may be configured to install a global event listener for all or parts of a loaded web page. The global event listener may capture clicks on any content containing an anchor tag. Accordingly, future clicks or web requests may be captured and processed by the JavaScript and thus, cause the requests to be rendered in client-side renderer 206.

Figure 3:
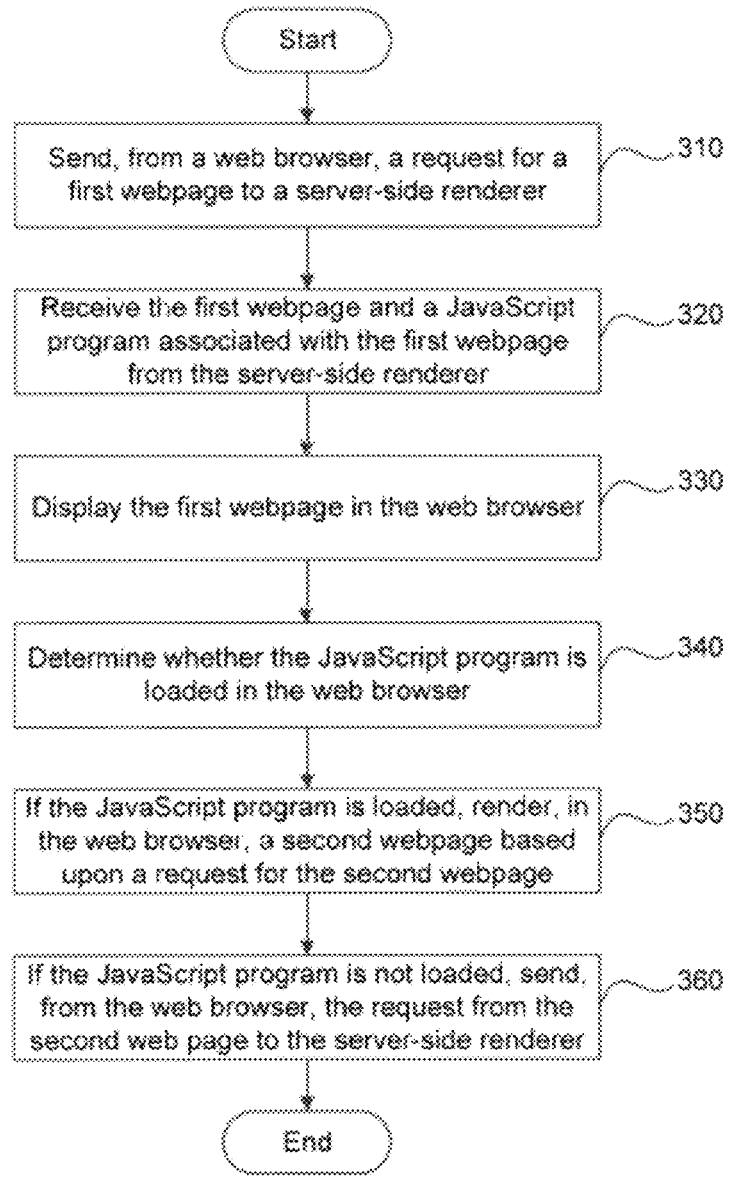
FIG. 3 is a flow diagram of a method for using hybrid webpage rendering, according to an embodiment.

FIG. 3 is a flow diagram of a method for using hybrid webpage rendering, according to an embodiment.

At block 310, a request for a first webpage is sent from a web browser to a server-side renderer. For example, web browser 202 may request a first web page from server-side renderer 210. The request may contain a URL and parameters. The request may be sent over any type of network, such as a WAN or a LAN. The request may be a GET request or a POST request as defined by HTTP.

At block 320, the first web page and JavaScript instructions associated with the first webpage are received from the server-side renderer. For example, server-side renderer 210 may send the JavaScript instructions associated with the first web page to web browser 202. The server-side renderer may use logic, parameters received with the request, and data from a variety of data sources, such as external databases, to render the requested webpage and create the JavaScript instructions. The rendered webpage and the associated JavaScript instructions may then be sent to the web browser. The rendered webpage may be sent over of a computer network, such as the Internet, using a communication protocol, for example, HTTP.

At block 330, the first webpage is displayed in the web browser. For example, the first web page may be displayed in web browser 202. The webpage may be displayed such that a user may view the content of the webpage in the web browser. This may enable the user to click on links or buttons, or interact in a variety of other ways with the rendered webpage. These interactions may cause additional webpages to be requested.

At block 340, it is determined if the JavaScript instructions are loaded in the web browser. For example, renderer determination module 222 may determine if the JavaScript instructions are loaded in web browser 202. The JavaScript instructions may be determined to be loaded by crafting the instructions such that when they are completely loaded by the web browser they intercept all requests for additional webpages. In particular, in addition to describing how subsequent requests to webpages may be rendered client-side, the JavaScript instructions may also be configured to intercept all requests for webpages by installing a global event listener. The global event listener may intercept some or all request for subsequent webpages by capturing clicks to anchor tags. Accordingly, once the instructions are loaded all requests may automatically be handled by the JavaScript instructions, and thus, webpages may be rendered client-side.

At block 350, if the JavaScript instructions are loaded, a request for a second webpage may be rendered in the web browser. For example, if renderer determination module 222 determines that the JavaScript instructions are loaded, then a request for a second webpage may be rendered client-side in web browser 202. If the JavaScript instructions are loaded, they may be configured to intercept all subsequent requests for webpages. Once a subsequent request is received for a webpage, the JavaScript instructions may instruct the web browser to query a server device for additional data needed to render the requested webpage. This data may be requested using AJAX, for example. The web browser may then execute the JavaScript instructions in conjunction with data received to render the requested webpage.

At block 360, if the JavaScript instructions are not loaded, a request for a second webpage may be sent from the web browser to the server-side renderer. For example, if renderer determination module 222 determines that the JavaScript instructions are not loaded, then web browser 202 may send a request to server-side renderer 210 to render the request for a second webpage server-side. The first webpage may contain links to resources and webpages on the server. The web browser may be configured to request all webpages from a server by default. As discussed with respect to block 350, however, JavaScript instructions may be configured to intercept such requests. Thus, if a user were to request a webpage, by clicking on a link or other type of content, the request by default (unless JavaScript instructions intercept such a request) may be rendered server-side because the content contains a URL to a server-side webpage or resource.

Figure 4:
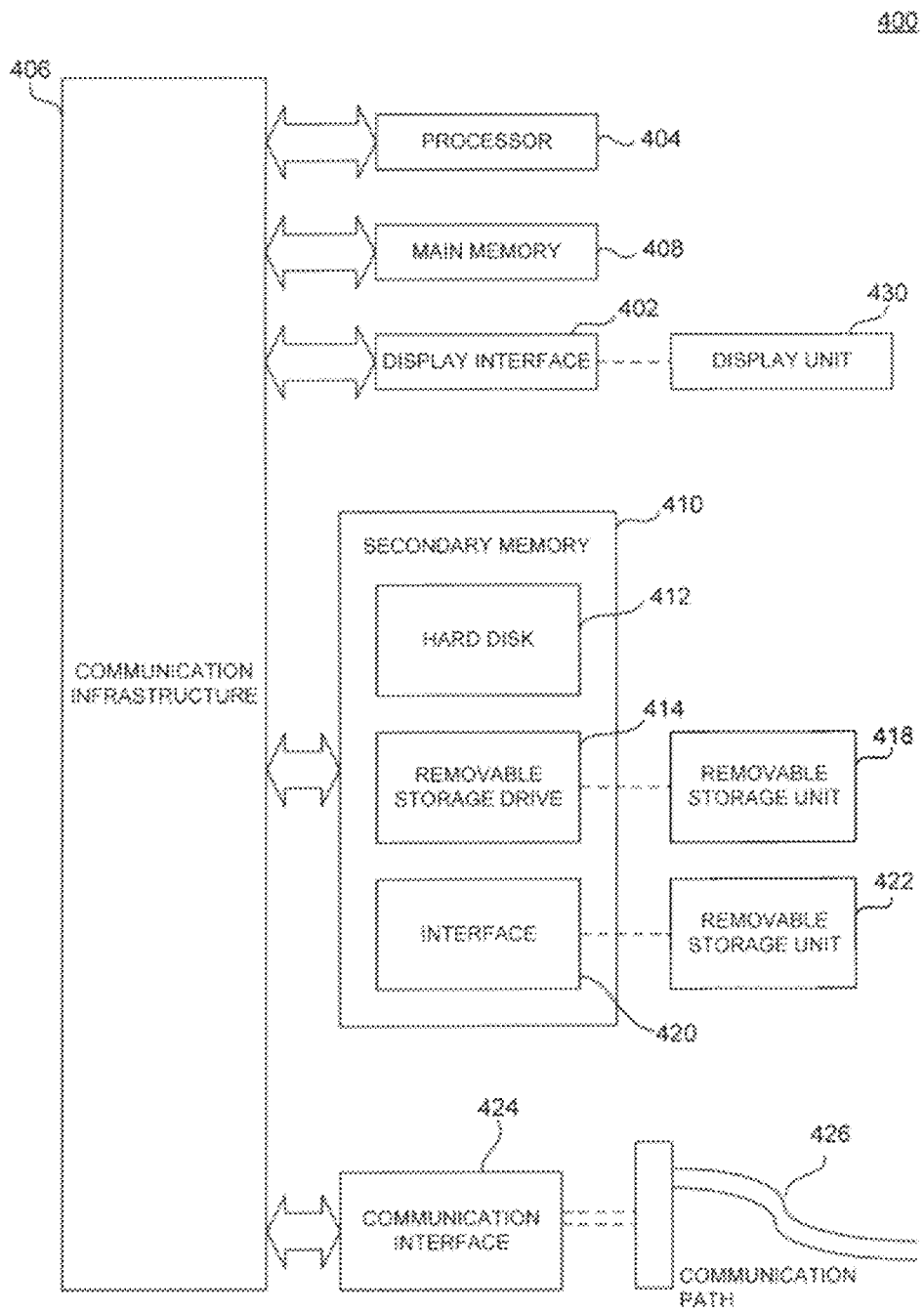
FIG. 4 illustrates an example computer system.

FIG. 4 illustrates an example computer system. For example, system 200, web browser 202, or server device 204, including portions thereof, may be implemented in computer system 400 using hardware, software, firmware, tangible computer readable media having instructions stored thereon, or a combination thereof and may be implemented in one or more computer systems or other processing systems. Hardware, software, or any combination of such may embody any of the modules, procedures, and components in FIGS. 1-3.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 400. After reading this description, it will become apparent to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 404 may also be a single processor in a multi-core/multiprocessor system, such system operating alone, or in a cluster of computing devices operating in a cluster or server farm. Processor device 404 is connected to a communication infrastructure 406, for example, a bus, message queue, network, or multi-core message-passing scheme.

Computer system 400 also includes a main memory 408, for example, random access memory (RAM), and may also include a secondary memory 410. Secondary memory 410 may include, for example, a hard disk drive 412 and removable storage drive 414. Removable storage drive 414 may include a floppy disk drive, a magnetic tape drive, an optical disk drive, a flash memory, or the like. The removable storage drive 414 reads from and/or writes to a removable storage unit 418 in a well-known manner. Removable storage unit 418 may include a floppy disk, magnetic tape, optical disk, etc. which is read by and written to by removable storage drive 414. As will be appreciated by persons skilled in the relevant art, removable storage unit 418 includes a computer readable storage medium having stored thereon computer software and/or data.

Computer system 400 (optionally) includes a display interface 402 (which can include input and output devices such as keyboards, mice, etc.) that forwards graphics, text, and other data from communication infrastructure 406 (or from a frame buffer not shown) for display on display unit 430.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card.

Some embodiments may be directed to computer products comprising software stored on any computer readable storage medium. Such software, when executed in one or more data processing device, causes a data processing device(s) to operate as described herein.

Certain embodiments may be implemented in hardware, software, firmware, or a combination thereof. Some embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A computer-implemented method for rendering webpages, comprising:
    sending, from a web browser, a request for a first webpage to a server-side renderer;
    receiving, in the web browser, the first webpage and scripting instructions associated with the first web page from the server-side renderer, wherein the first webpage was rendered by the server-side renderer;
    displaying the first webpage in the web browser, wherein the first webpage is rendered with content that when interacted with by a user prior to the scripting instructions being loaded, causes the web browser to execute an initial functionality, the initial functionality comprising requesting a second web page from the server-side renderer;
    loading the scripting instructions in the web browser, wherein the scripting instructions, when fully loaded, replace the initial functionality with a second functionality comprising requesting external data; and
    rendering the external data, in the web browser, using the loaded scripting instructions.

2. The computer-implemented method of claim 1, wherein the second functionality comprises:
    intercepting a request for the second webpage in response to the user interacting with the content; and
    requesting external data associated with the second webpage.

3. The computer-implemented method of claim 2, wherein the intercepting comprises:
    installing a global event listener to receive requests for the second webpage.

4. The computer-implemented method of claim 1, wherein the scripting instructions comprise:
    directing the web browser to download asynchronously further scripting instructions, wherein the further scripting instructions, when fully loaded, replace the initial functionality with a second functionality that:
        intercepts a request for the second webpage in response to the user interacting with the content, and
        requests external data associated with the second webpage.

5. The computer-implemented method of claim 1, wherein:
    the first webpage uses asynchronous JavaScript and XML; and
    the second webpage uses asynchronous JavaScript and XML.

6. The computer-implemented method of claim 2, wherein the request for the second webpage is created based upon a link in the first webpage.

7. A system for rendering webpages comprising:
    a server device comprising:
        a server-side renderer configured to send a rendered webpage and scripting instructions with the rendered webpage based upon a webpage request, and
        a data provider configured to send external data based upon a data request received from a client; and
    a web browser comprising:
        a server-side request module configured to:
            send a webpage request to the server,
            receive the rendered webpage and the scripting instructions from the server, wherein the rendered webpage comprises content that when interacted with by a user prior to the scripting instructions being loaded, causes the web browser to execute an initial functionality, the initial functionality comprising requesting a second web page from the server-side renderer, and a client-side renderer configured to:
load the scripting instructions in the web browser, wherein the scripting instructions, when fully loaded, replace the initial functionality with a second functionality comprising requesting external data, and
render the external data, in the web browser, using the loaded scripting instructions.

8. The system of claim 7, wherein the second functionality comprises:
intercepting a request for the second webpage in response to the user interacting with the content; and
requesting external data associated with the second webpage.

9. The system of claim 8, wherein the intercepting comprises:
installing a global event listener to receive requests for the second webpage.

10. The system of claim 7, wherein the scripting instructions comprise:
directing the web browser to download asynchronously further scripting instructions, wherein the further scripting instructions, when fully loaded, replace the initial functionality with a second functionality that:
intercepts a request for the second webpage in response to the user interacting with the content, and
requests external data associated with the second webpage.

11. The system of claim 7, wherein the web browser supports HTML5.

12. The system of claim 7, wherein:
the first webpage uses asynchronous JavaScript and XML; and
the second webpage uses asynchronous JavaScript and XML.

13. The system of claim 8, wherein the request for the second webpage is created based upon a link in the first webpage.

14. A non-transitory computer-readable medium storing software comprising instructions executable by one or more computers which, upon such execution, cause the one or more computers to perform operations comprising:
sending, from a web browser, a request for a first webpage to a server-side renderer;
receiving, in the web browser, the first webpage and scripting instructions associated with the first web page from the server-side renderer, wherein the first webpage was rendered by the server-side renderer;
displaying the first webpage in the web browser, wherein the first webpage is rendered with content that when interacted with by a user prior to the scripting instructions being loaded, causes the web browser to execute an initial functionality, the initial functionality comprising requesting a second web page from the server-side renderer;
loading the scripting instructions in the web browser, wherein the scripting instructions, when fully loaded, replace the initial functionality with a second functionality comprising requesting external data; and
rendering the external data, in the web browser, using the loaded scripting instructions.

15. A non-transitory computer-readable medium of claim 14, wherein the second functionality comprises:
intercepting a request for the second webpage in response to the user interacting with the content; and
requesting external data associated with the second webpage.

16. A non-transitory computer-readable medium of claim 15, wherein the intercepting comprises:
installing a global event listener to receive requests for the second webpage.

17. A non-transitory computer-readable medium of claim 14, wherein the scripting instructions comprise:
directing the web browser to download asynchronously further scripting instructions, wherein the further scripting instructions, when fully loaded, replace the initial functionality with a second functionality comprising:
intercepting a request for the second webpage in response to the user interacting with the content; and
requesting external data associated with the second webpage.

18. A non-transitory computer-readable medium of claim 14, wherein the web browser supports HTML5.

19. A non-transitory computer-readable medium of claim 14, wherein:
the first webpage uses asynchronous JavaScript and XML; and
the second webpage uses asynchronous JavaScript and XML.

20. A non-transitory computer-readable medium of claim 14, wherein the request for the second webpage is created based upon a link in the first webpage.

* * * * *